(12) United States Patent
Kim et al.

(10) Patent No.: US 9,004,099 B2
(45) Date of Patent: Apr. 14, 2015

(54) CHECK VALVE FOR VARIABLE CAPACITY COMPRESSOR OF VEHICLE

(75) Inventors: Ki Yoen Kim, Gyeonggi-do (KR); Gwi Seung In, Chungcheongnam-do (KR)

(73) Assignee: LTC., Ltd, Jellabuk-Do (KR)

( * ) Notice: Subject to any disclaimer, the term of this patent is extended or adjusted under 35 U.S.C. 154(b) by 0 days.

(21) Appl. No.: 13/636,018

(22) PCT Filed: Mar. 21, 2012

(86) PCT No.: PCT/KR2012/002014
§ 371 (c)(1),
(2), (4) Date: Sep. 19, 2012

(87) PCT Pub. No.: WO2013/103177
PCT Pub. Date: Jul. 11, 2013

(65) Prior Publication Data
US 2014/0311596 A1   Oct. 23, 2014

(30) Foreign Application Priority Data
Jan. 5, 2012 (KR) .................. 10-2012-0001564

(51) Int. Cl.
| | |
|---|---|
| F16K 15/02 | (2006.01) |
| F16K 21/02 | (2006.01) |
| F16K 21/04 | (2006.01) |
| F04B 53/10 | (2006.01) |
| F04B 25/04 | (2006.01) |
| F04B 27/08 | (2006.01) |
| F04B 27/14 | (2006.01) |
| F16K 15/06 | (2006.01) |
| F04B 27/10 | (2006.01) |
| F04B 39/10 | (2006.01) |
| F16K 27/02 | (2006.01) |

(52) U.S. Cl.
CPC ............... *F04B 53/10* (2013.01); *F04B 25/04* (2013.01); *F04B 27/08* (2013.01); *F04B 27/14* (2013.01); *F16K 15/06* (2013.01); *F04B 27/1009* (2013.01); *F04B 39/10* (2013.01); *F16K 15/026* (2013.01); *F16K 27/0209* (2013.01); *F16K 15/025* (2013.01)

(58) Field of Classification Search
CPC ..... F01B 25/10; F16K 15/021; F16K 15/025; F16K 15/02; F16K 17/0466; F16K 17/082; F16K 29/00
USPC ........... 137/513.3, 513.5, 528, 535, 538, 540, 137/543.17, 543.19, 543.21; 251/120
See application file for complete search history.

(56) References Cited

U.S. PATENT DOCUMENTS

| | | | | |
|---|---|---|---|---|
| 1,150,743 | A * | 8/1915 | Butts ..................... | 137/516.29 |
| 5,010,916 | A * | 4/1991 | Albrecht ............... | 137/454.2 |
| 6,435,848 | B1 * | 8/2002 | Minami et al. ........ | 417/440 |
| 6,971,406 | B2 * | 12/2005 | Takahashi ............. | 137/543.19 |
| 7,581,560 | B2 * | 9/2009 | Koch et al. ............ | 137/543.19 |
| 8,276,613 | B2 * | 10/2012 | Park et al. ............. | 137/535 |
| 8,276,614 | B2 * | 10/2012 | Park et al. ............. | 137/540 |
| 8,671,976 | B2 * | 3/2014 | Park et al. ............. | 137/543.19 |
| 8,833,389 | B2 * | 9/2014 | Dziurda et al. ....... | 137/539 |

* cited by examiner

*Primary Examiner* — Craig Schneider
*Assistant Examiner* — Frederick D Soski
(74) *Attorney, Agent, or Firm* — Norris McLaughlin & Marcus P.A.

(57) ABSTRACT

Disclosed is a check valve for a variable capacity compressor of a vehicle, which includes a valve seat including a refrigerant introduction hole, a valve case disposed above the valve seat, and including refrigerant discharge holes along a circumferential surface of a cylindrical body thereof, a spool valve disposed within the valve case to selectively open and close the refrigerant introduction hole and the refrigerant discharge holes, and an elastic member disposed between the valve case and the spool valve.

7 Claims, 10 Drawing Sheets

Fig. 1

-- PRIOR ART --

Fig. 2

-- PRIOR ART --

Fig. 3

-- PRIOR ART --

-- PRIOR ART --

Fig. 6

-- PRIOR ART --

CHECK VALVE FOR VARIABLE CAPACITY COMPRESSOR OF VEHICLE

This application is a 371 application of PCT/KR2012/002014 filed Mar. 21, 2012, which claims foreign priority benefit under 35 U.S.C. §119 European Application No. 10-2012-0001564 filed Jan. 5, 2012.

TECHNICAL FIELD

The present invention relates to a valve used in a variable capacity compressor of a vehicle, and more particularly, to a check valve for a variable capacity compressor of a vehicle, which decreases valve noise between a valve case and a spool valve.

BACKGROUND ART

In general, a compressor for a vehicle air conditioner selectively receives power from a power source according to connection/disconnection operations of a clutch, receives refrigerant gas from an evaporator, compresses the refrigerant gas according to a linear reciprocation operation of a piston, and transfers the compressed refrigerant gas to a condenser.

Particularly, variable capacity compressors, which control an inclination angle of a swash plate to vary the discharge capacity thereof, are widely used.

Figure 1:
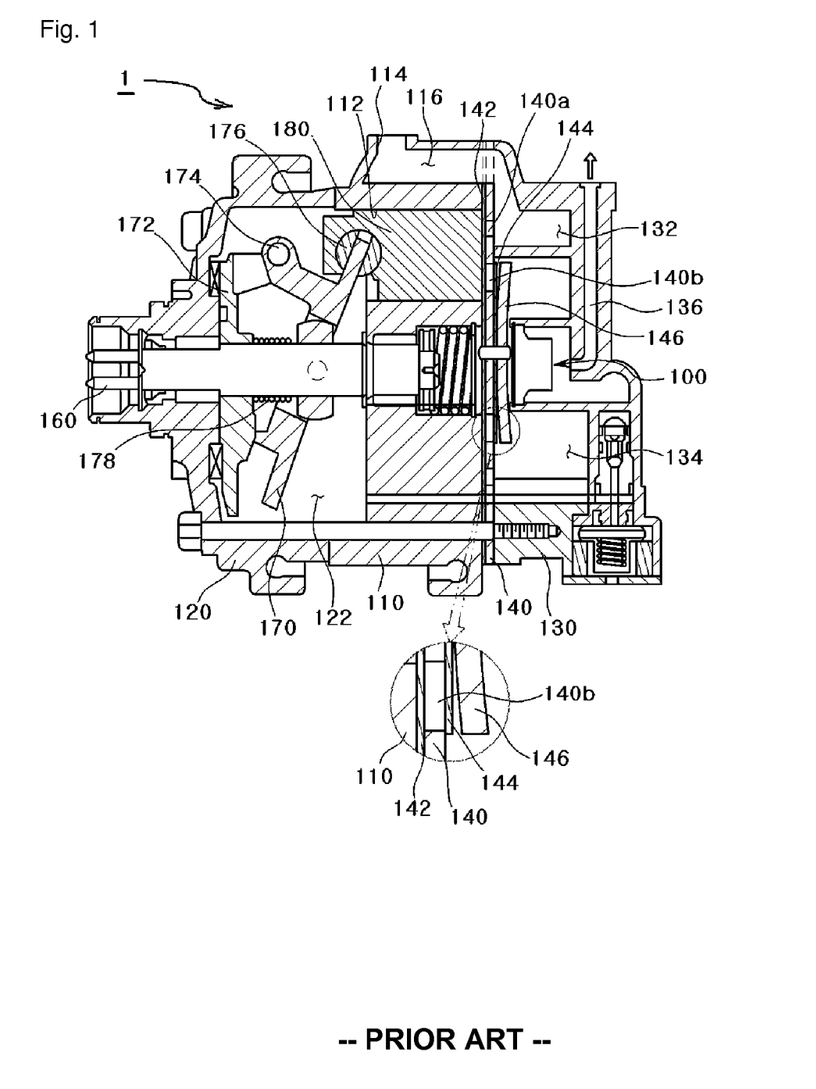
FIG. 1 is a cross-sectional view illustrating a check valve for a variable capacity compressor of a vehicle in the related art.

Referring to FIG. 1, a typical variable capacity swash plate type compressor 1 includes: a cylinder block 110 having cylinder bores 112 therein, and including an intake port 114 and an intake muffler chamber 116; a front housing 120 coupled to the front portion of the cylinder block 110, and forming a crank chamber 122 therein; an intake chamber 132 and a discharge chamber 134, which are disposed behind the cylinder block 110; and a rear housing 130 provided with a discharge passage 136.

A valve plate 140, through which refrigerant is introduced and discharged, is disposed between the front housing 120 and the rear housing 130, and has a circular plate shape. The valve plate 140 includes a plurality of refrigerant intake ports 140a and a plurality of refrigerant discharge ports 140b. The refrigerant intake ports 140a are arrayed along an outer circular arc about the front center of the valve plate 140, and the refrigerant discharge ports 140b are arrayed along an inner circular arc about the front center thereof.

An intake reed valve 142 is disposed on the front portion of the valve plate 140, and a discharge reed valve 144 and a retainer 146 are sequentially disposed on the rear portion thereof. A check valve 100 prevents a back flow of the refrigerant to the front side of the valve plate 140.

Further, the swash plate type compressor 1 includes: a driving shaft 160 rotatably disposed in the central portion of the cylinder block 110 and the front housing 120; a swash plate 170 connected through a hinge part 174 to a rotor 172 installed on the driving shaft 160 within the crank chamber 122 wherein an inclination angle of the swash plate 170 is varied according to a pressure variation within the crank chamber 122; and a plurality of pistons 180 connected through a shoe 176 to an edge of the swash plate 170, and reciprocating within the cylinder bores 112 according to a rotation of the swash plate 170 so as to introduce or compress the refrigerant.

A compression coil spring 178 is disposed between the swash plate 170 and the rotor 172 to return the swash plate 170 to the initial position thereof. Thus, the driving shaft 160 and the swash plate 170 integrally rotate so as to discharge the refrigerant compressed within the cylinder block 110, to a condenser through the discharge passage 136, and a discharged amount of the refrigerant is varied according to inclination angles of the swash plate 170.

When an air conditioner of a vehicle is turned off, the swash plate 170 is maintained at a minimum inclination angle, but the minimum inclination angle is not zero. Thus, even when the air conditioner is turned off, a portion of the refrigerant may be discharged from the swash plate type compressor 1 to the condenser. Thus, the check valve 100 is disposed on the rear end of the valve plate 140 in order to prevent refrigerant from being discharged when the air conditioner is turned off, and simultaneously to prevent discharged refrigerant from being returned from the condenser to the swash plate type compressor 1.

Referring to FIGS. 2 to 5, the check valve 100 includes: a valve seat 200 including a refrigerant introduction hole 210 in the central portion thereof; a valve case 300 disposed above the valve seat 200 and including first and second refrigerant discharge holes 310 and 320 along a circumferential surface of a cylindrical body thereof at front and both lateral sides thereof; a spool valve 400 disposed within the valve case 300 to selectively open and close the refrigerant introduction hole 210 and the first and second refrigerant discharge holes 310 and 320; and an elastic member 500 inserted between a support part 330 of the valve case 300 and a stepped part 440 of the spool valve 400.

Figure 2:
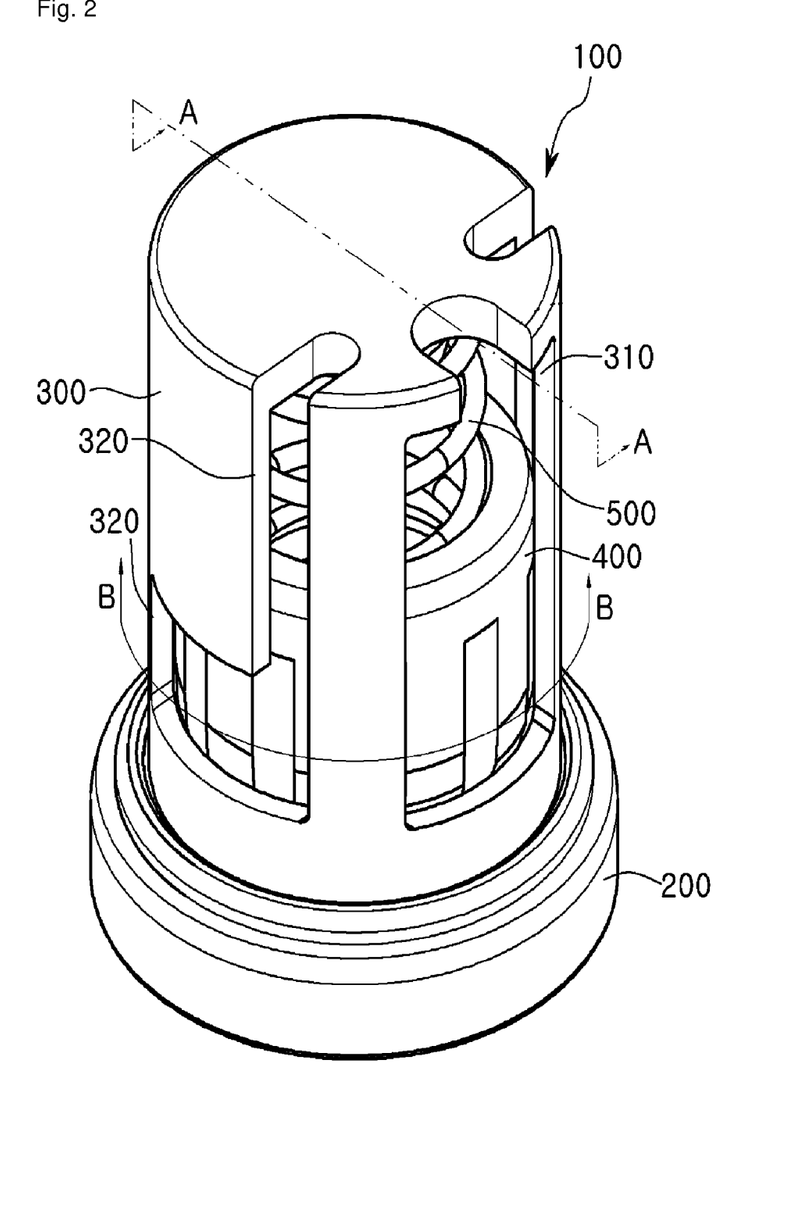
FIG. 2 is a perspective view illustrating a check valve in the related art.
Figure 3:
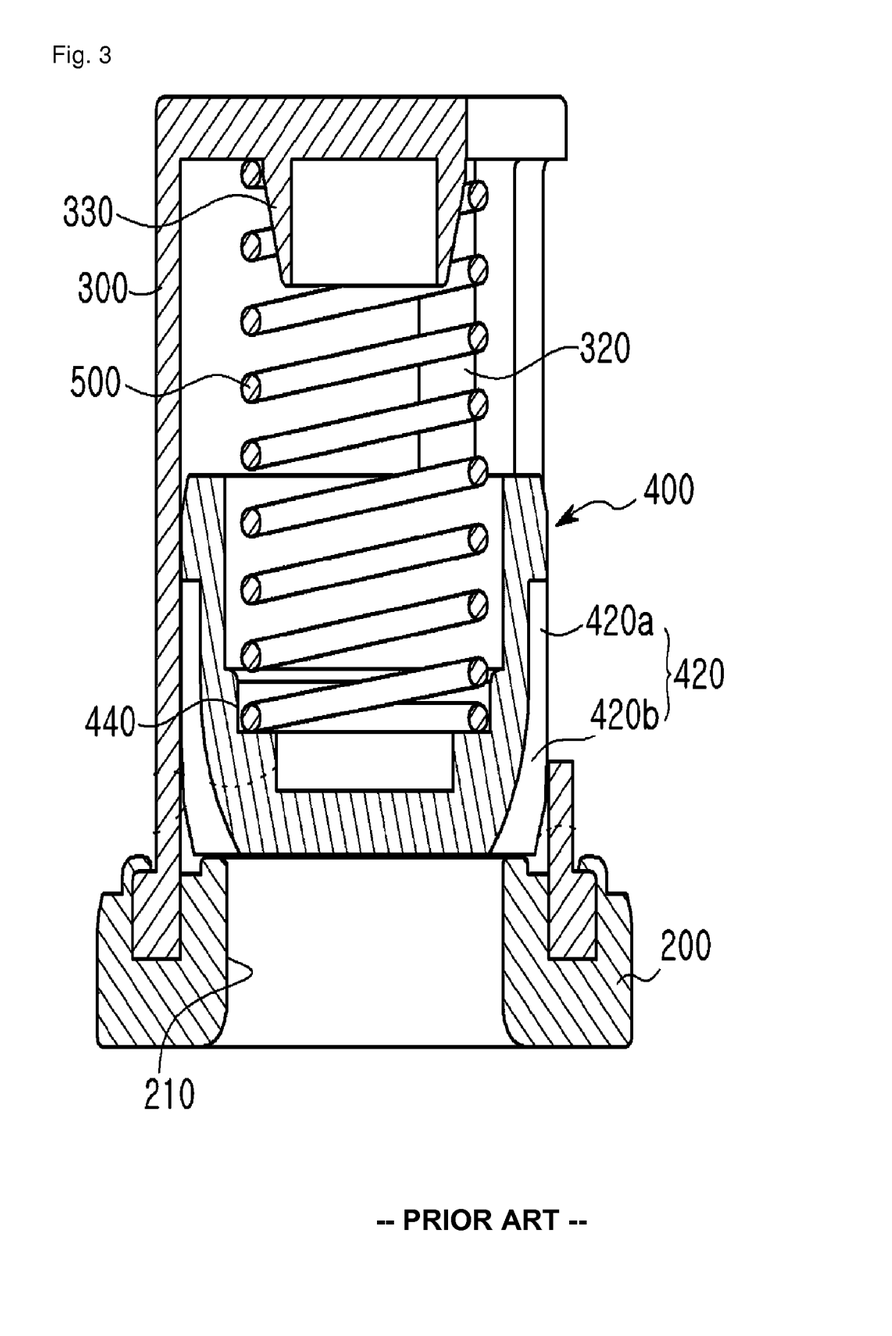
FIG. 3 is a cross-sectional view taken along line A-A of FIG. 2.
Figure 4:
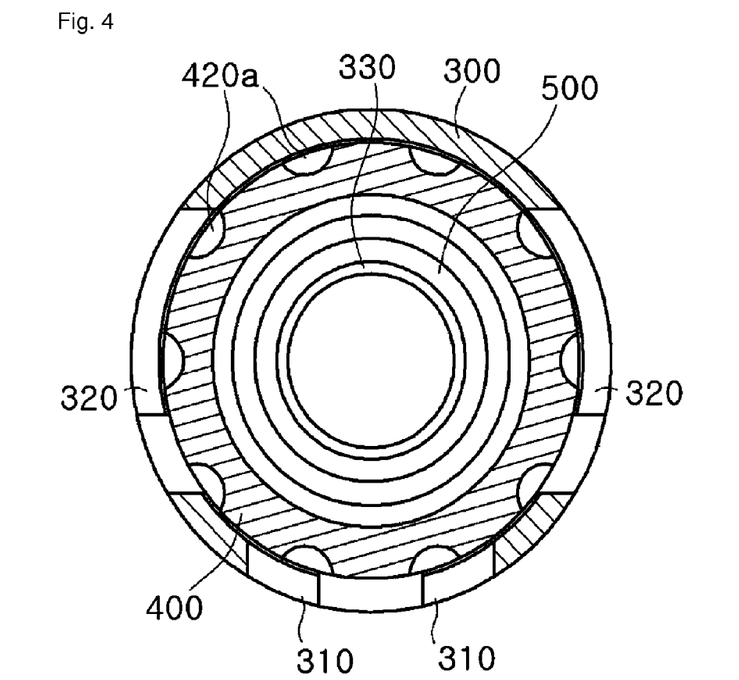
FIG. 4 is a cross-sectional view taken along line B-B of FIG. 2.

The first refrigerant discharge hole 310 and a pair of the second refrigerant discharge holes 320 are asymmetrically arrayed along the circumferential surface of the cylindrical body of the valve case 300. Thus, when refrigerant pressure is equal to spring force of the elastic member 500, and the spool valve 400 is vertically moved, the spool valve 400 tightly contacts a wall surface of the valve case 300 provided with the first and second refrigerant discharge holes 310 and 320, and thus, is prevented from moving left and right.

Figure 5:
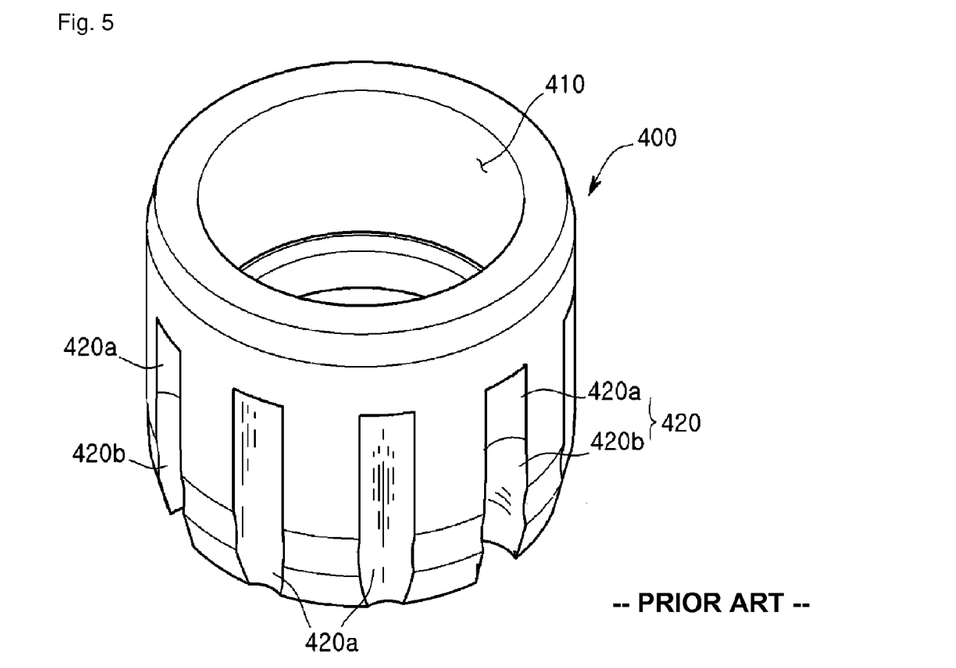
FIG. 5 is a perspective view illustrating a spool valve of FIG. 2.

The spool valve 400 includes grooves 420 that longitudinally extend along a circumferential surface of a cylindrical body thereof.

The grooves 420 include a plurality of first grooves 420a and a plurality of second grooves 420b. The first grooves 420a longitudinally extend along the circumferential surface of the cylindrical body of the spool valve 400, and are spaced a constant distance from one another. The second grooves 420b are disposed, respectively, in two pairs of the first grooves 420a facing each other, and extend from a bottom surface of the valve case 300 to introduce the refrigerant, and have a depth greater than that of the first grooves 420a.

Thus, when the spool valve 400 is initially opened, and the refrigerant is introduced through the refrigerant introduction hole 210, the refrigerant sequentially passes through the second grooves 420b and the first grooves 420a to slowly open the spool valve 400, thereby decreasing valve noise.

However, although the first and second refrigerant discharge holes 310 and 320 are asymmetrically arrayed, and the grooves 420 are configured as described above, when back pressure of the refrigerant exceeds a certain level, the spool valve 400, which would otherwise tightly contact an inner wall of the valve case 300, is spaced apart from the inner wall, and is moved left and right. Thus, the check valve 100 has a limitation in decreasing the valve noise according to back pressure of the refrigerant.

DISCLOSURE OF THE INVENTION

Technical Problem

To solve the above-described problems, an object of the present invention is to provide a check valve for a variable capacity compressor of a vehicle in which a spool valve tightly contacts an inner wall of a valve case with a minimum frictional area therebetween regardless of back pressure of refrigerant so as to decrease frictional resistance and prevent movement of the spool valve, thereby decreasing valve noise.

Another object of the present invention is to provide a spool valve having an increased length so that the spool valve is stably inclined, thereby effectively preventing vibration of the spool valve when refrigerant is initially introduced.

Another object of the present invention is to provide a cylindrical valve case including a refrigerant discharge hole in a rear high place of a circumferential surface thereof to prevent middle vibrations of a spool valve due to an eddy when the spool valve is moved upward.

Technical Solution

In one embodiment, a check valve for a variable capacity compressor of a vehicle includes: a valve seat including a refrigerant introduction hole; a valve case disposed above the valve seat, and including refrigerant discharge holes along a circumferential surface of a cylindrical body thereof; a spool valve disposed within the valve case to selectively open and close the refrigerant introduction hole and the refrigerant discharge holes; and an elastic member disposed between the valve case and the spool valve, wherein the valve case includes: a first refrigerant discharge hole disposed in a front portion of the circumferential surface thereof, wherein the first refrigerant discharge hole has a small width, and extends along a longitudinal direction of the valve case; a pair of second refrigerant discharge holes disposed in both side portions of the circumferential surface thereof, wherein a lower end of the second refrigerant discharge holes is higher than a lower end of the first refrigerant discharge hole; and a third refrigerant discharge hole disposed in a portion of the circumferential surface thereof to face the first refrigerant discharge hole, wherein a lower end of the third refrigerant discharge hole is higher than the lower end of the second refrigerant discharge holes, the valve seat includes at least one refrigerant guide recess disposed in an inner wall thereof, and inclined upward, wherein the refrigerant guide recess is disposed within the width of the first refrigerant discharge hole, and a small gap is formed between an inner wall of the valve case and an outer wall of the spool valve such that when the refrigerant introduction hole is opened, a front portion of the spool valve is selectively raised, and the spool valve is inclined from the inner wall of the valve case, and tightly contacts the inner wall.

The third refrigerant discharge hole, disposed in the portion of the circumferential surface to face the first refrigerant discharge hole, may be adjacent to a closed top of the valve case.

A vertical length of the spool valve may be at least half an entire height of the cylindrical body of the valve case.

The spool valve may include grooves arrayed with a certain interval along a circumferential surface of a cylindrical body thereof, and extending in a longitudinal direction thereof.

The first refrigerant discharge hole may extend from the circumferential surface of the valve case to a top thereof.

A lower end width of the first refrigerant discharge hole may be smaller than an upper width thereof. The lower end of the first refrigerant discharge hole may have one of an inverted triangular shape, a trapezoidal shape, and a tetragonal shape, which decreases in width upwardly.

Advantageous Effects

According to the embodiment of the present invention, refrigerant guide recesses are disposed in the front portion of a valve seat, and refrigerant discharge holes are disposed at different heights. Thus, when refrigerant is introduced into a check valve, and a spool valve is vertically moved, the front portion of the spool valve is raised to minimize tight contact areas between an inner wall of a valve case and a front lower portion and a rear upper portion of the spool valve, thereby decreasing frictional resistance and valve noise, and effectively preventing middle vibrations of the spool valve.

BEST MODE FOR CARRYING OUT THE INVENTION

Exemplified embodiments of the present invention will now be described with reference to the accompanying drawings.

The present invention may, however, be embodied in different forms and should not be construed as limited to the embodiments set forth herein.

These embodiments are provided so that this disclosure will be thorough and complete, and will fully convey the concept of the invention to those skilled in the art. Thus, the shape and size of elements in the drawings may be exaggerated for clarity, and like reference numerals denote like elements throughout. Furthermore, parts having like functions and operations are denoted by like reference numerals throughout.

The meaning of "include", "comprise", "including" or "comprising" specifies a property, a region, a fixed number, a step, a process, an element and/or a component but does not exclude other properties, regions, fixed numbers, steps, processes, elements and/or components.

Figure 6:
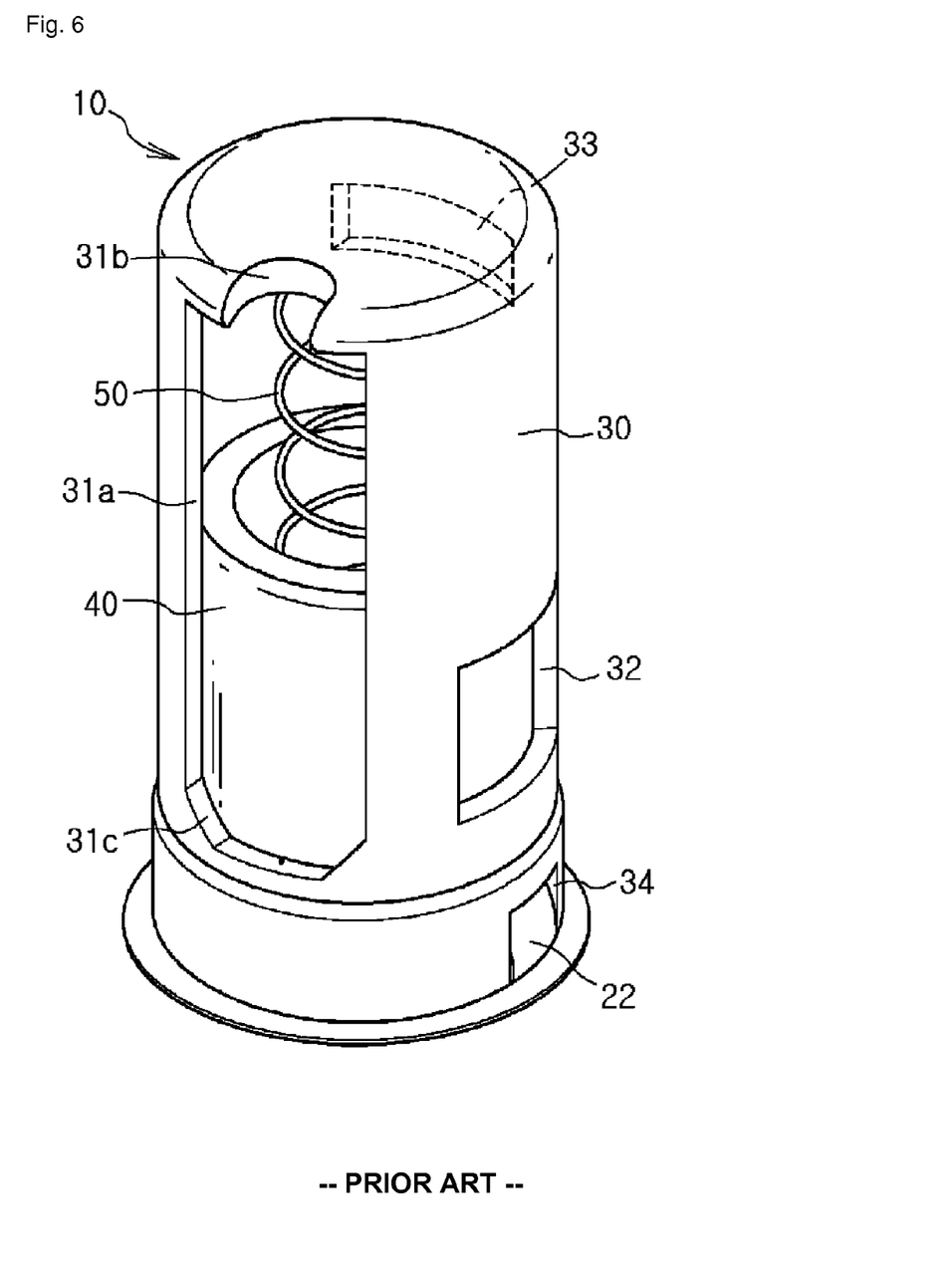
FIG. 6 is a perspective view illustrating a section valve according to an embodiment of the present invention.

For convenience in description of the following embodiments, a side of FIG. 6 where a valve seat is disposed, a side thereof where a valve case is disposed, a side thereof where a first refrigerant discharge hole is disposed, and a side thereof where a third refrigerant discharge hole is disposed are referred to as a "lower side", an "upper side", a "front side", and a "rear side", respectively.

Referring to FIGS. 6 to 11, a check valve 10 according to an embodiment of the present invention includes: a valve seat 20 including a refrigerant introduction hole 23; a valve case 30 disposed above the valve seat 20 and including first to third refrigerant discharge holes 31, 32, and 33 along a circumferential surface of a cylindrical body thereof; a spool valve 40 disposed within the valve case 30 and vertically moving to selectively open and close the refrigerant introduction hole 23 and the first to third refrigerant discharge holes 31, 32, and 33; and an elastic member 50 inserted between the valve case 30 and the spool valve 40.

Figure 11:
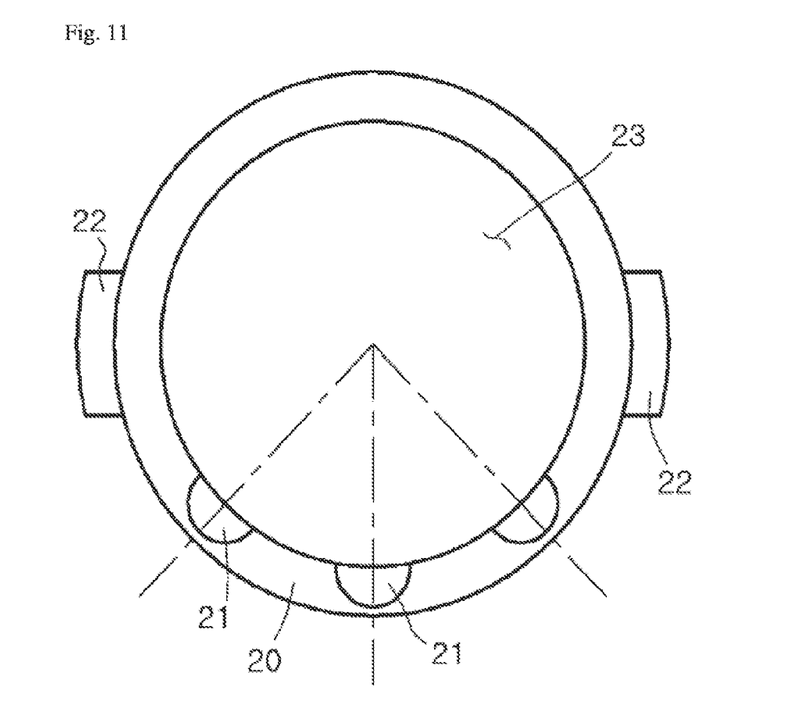
FIG. 11 is a plan view illustrating a valve seat of FIG. 6.

The valve seat 20 includes one or more refrigerant guide recesses 21 in the upper front portion of an inner wall thereof. The refrigerant guide recesses 21 are disposed within a width of the first refrigerant discharge hole 31, and are inclined upward. Thus, when the spool valve 40 is initially opened, refrigerant can be discharged first to the front side of the spool valve 40.

One of the refrigerant guide recesses 21 may be disposed at the front side of the valve seat 20, and the other refrigerant guide recesses 21 may be spaced, respectively, left and right from the refrigerant guide recess 21 disposed at the front side, by a certain angle, for example, by about 45° so as to correspond to a lower width of the first refrigerant discharge hole 31. Thus, when the spool valve 40 is initially opened, the refrigerant is intensively discharged to the front side of the spool valve 40 through the refrigerant guide recesses 21 so as to obliquely raise the front portion of the spool valve 40.

However, the present invention is not limited thereto, and thus, the number and positions of the refrigerant guide recesses 21 may be varied within the width of the first refrigerant discharge hole 31, provided that the refrigerant is intensively discharged to the front side of the spool valve 40.

Figure 7:
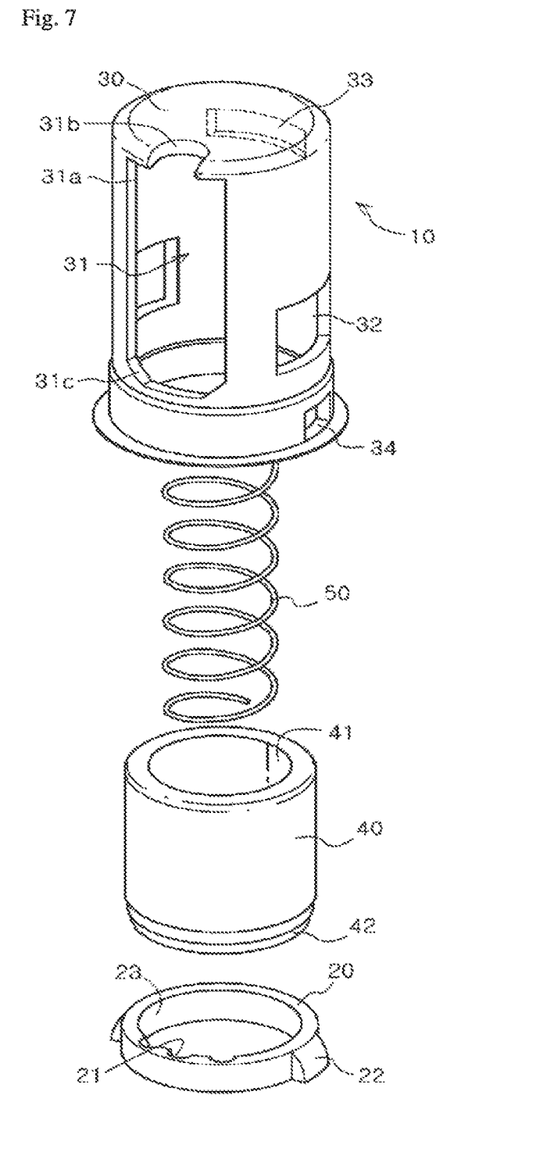
FIG. 7 is an exploded perspective view illustrating the section valve of FIG. 6.

A pair of coupling protrusions 22 may be disposed on both sides of an outer wall of the valve seat 20, and face a pair of lower coupling recesses 34 of the valve case 30, so as to facilitate aligning of the first refrigerant discharge hole 31 with the refrigerant guide recesses 21 when the valve seat 20 is coupled to the valve case 30. The valve case 30 may have a cylindrical structure with a closed top and an open bottom through which the valve seat 20 is inserted and fixed thereto. The lower coupling recesses 34 are disposed in both sides of the lower portion of the valve case 30. The coupling protrusions 22 are fitted in and fixed to the lower coupling recesses 34, respectively.

The first refrigerant discharge hole 31 is disposed in the front portion of the circumferential surface of the cylindrical body of the valve case 30. A pair of the second refrigerant discharge holes 32 are disposed at both sides of the first refrigerant discharge hole 31. The third refrigerant discharge hole 33 is disposed in the rear portion of the valve case 30 facing the first refrigerant discharge hole 31. Each of the first to third refrigerant discharge holes 31, 32, and 33 may have a shape having a certain size, for example, a tetragonal shape in the circumferential surface of the cylindrical body of the valve case 30.

The lower end of the second refrigerant discharge holes 32 is higher than the lower end of the first refrigerant discharge hole 31. The lower end of the third refrigerant discharge hole 33 is higher than the lower end of the second refrigerant discharge holes 31.

The first refrigerant discharge hole 31 includes: a main discharge hole 31a having a tetragonal shape longitudinally extending in the circumferential surface of the cylindrical body of the valve case 30; and a discharge guide part 31c disposed at the lower end of the main discharge hole 31a to increase initial discharge speed of the refrigerant.

The discharge guide part 31c may decrease in width downwardly. For example, the discharge guide part 31c may have one of an inverted triangular shape, a trapezoidal shape, and a tetragonal shape. However, the discharge guide part 31c is not limited thereto, and thus, may have any shape to facilitate initial discharging of the refrigerant. Furthermore, the left and right sides of the discharge guide part 31c may be varied in angle and length.

The first refrigerant discharge hole 31 may include an auxiliary discharge hole 31b connected to the main discharge hole 31a, and opening a portion of the top of the valve case 30.

The auxiliary discharge hole 31b functions as a vent hole. Thus, when the spool valve 40 moves upward, back pressure is easily released through the auxiliary discharge hole 31b so as to prevent an eddy from being formed between the valve case 30 and the spool valve 40, thereby decreasing high frequency valve noise.

The third refrigerant discharge hole 33 faces the first refrigerant discharge hole 31 along the circumferential surface of the cylindrical body of the valve case 30, and may be adjacent to the closed top of the valve case 30. As such, the third refrigerant discharge hole 33 is disposed on a high place so as to effectively prevent middle vibrations that when the spool valve 40 moves upward, an eddy generated from the first refrigerant discharge hole 31 vibrates the spool valve 40.

Figure 8:
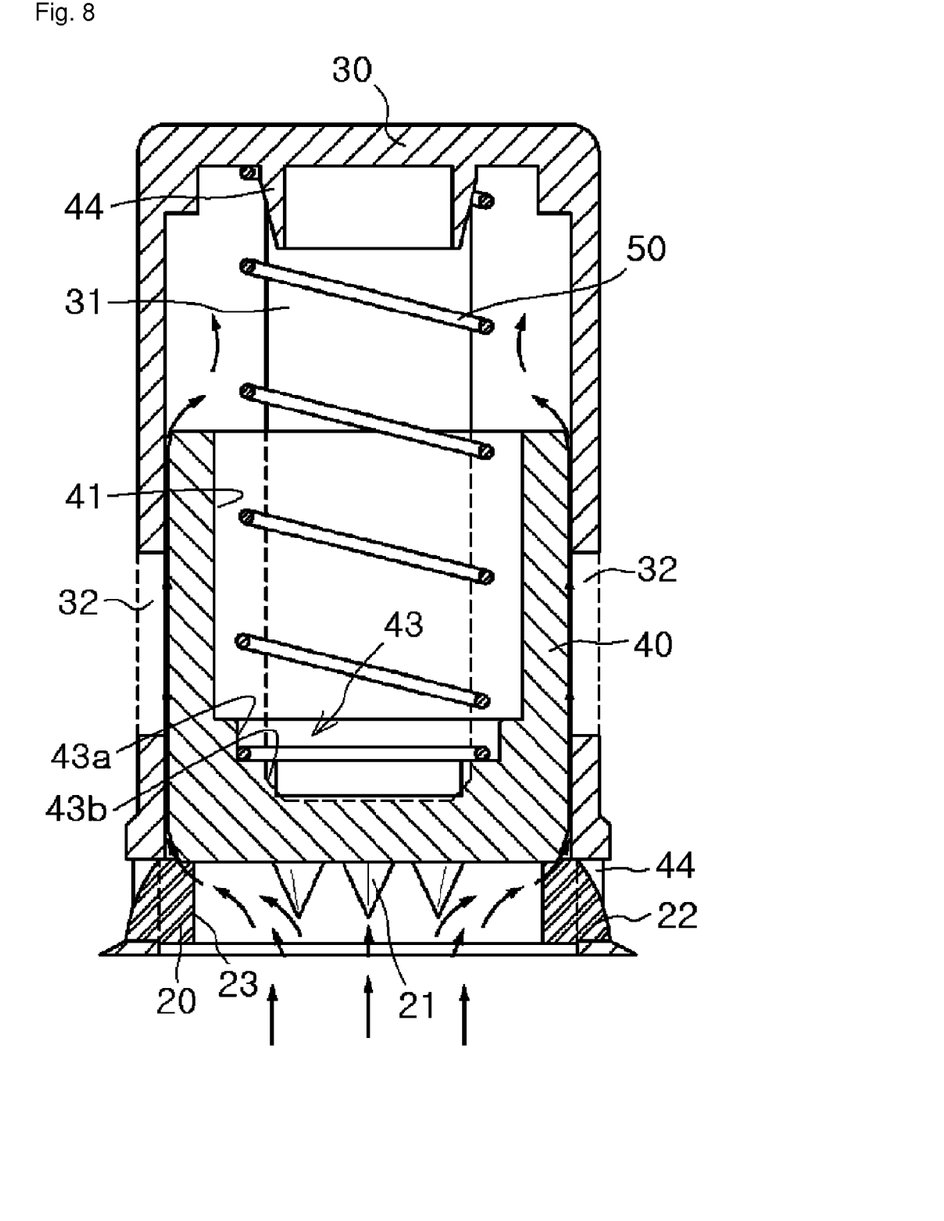
FIG. 8 is a front cross-sectional view illustrating the section valve of FIG. 6.

A support 44 extends downward from an inner upper central portion of the valve case 30. An end of the elastic member 50 is fitted on the support 44 and is supported thereby, and thus, is prevented from moving left and right.

An accommodation part 41 in which the other end of the elastic member 50 is inserted is disposed in the spool valve 40. Stepped parts 43 may be disposed on the lower end of the accommodation part 41.

The stepped parts 43 may include a first stepped part 43a on which the other end of the elastic member 50 is placed, and a second stepped part 43b disposed between the first stepped part 43a and the bottom surface of the stepped parts 43. Thus, both the ends of the elastic member 50 are supported by the support 44 of the valve case 30 and the stepped parts 43 of the spool valve 40, so as to support the spool valve 40 with a certain pressure and return the spool valve 40 to the original position thereof when refrigerant pressure is released.

A slope 42 is disposed at the lower end of the spool valve 40 along a circumferential surface of a cylindrical body thereof, and has a certain inclination angle, When the spool valve 40 is initially opened, the slope 42 stabilizes refrigerant pressure.

The spool valve 40 has an outer diameter smaller than an inner diameter of the valve case 30. Thus, a small gap is formed between an inner wall of the valve case 30 and an outer wall of the spool valve 40 to minimize frictional resistance when the spool valve 40 is vertically moved. When the spool valve 40 is inclined at a certain angle, the small gap minimizes a contact area between the outer wall of the spool valve 40 and the inner wall of the valve case 30.

A vertical length of the spool valve 40 may be at least half the entire height of the cylindrical body of the valve case 30. As such, since the spool valve 40 has an increased length, a contact length between the outer wall of the spool valve 40 and the inner wall of the valve case 30 is stably secured. Thus, when the refrigerant is initially introduced, vibration of the spool valve 40 can be effectively prevented.

If necessary, grooves (not shown) may be arrayed with a certain interval along the circumferential surface of the cylindrical body of the spool valve 40, and extend in the longitudinal direction thereof. The refrigerant introduced through the valve seat 20 is uniformly distributed along the circumferential surface of the cylindrical body of the spool valve 40 by the grooves.

When the spool valve 40 is initially opened, the grooves prevent the refrigerant from being excessively concentrated on the refrigerant guide recesses 21 disposed in the front portion of the valve seat 20. In addition, the grooves disperse a certain amount of the refrigerant so as to prevent the spool valve 40 from being excessively inclined, thereby decreasing low frequency valve noise.

A main operation structure of the spool valve 40 of the check valve 10 will now be described.

Figure 9A:
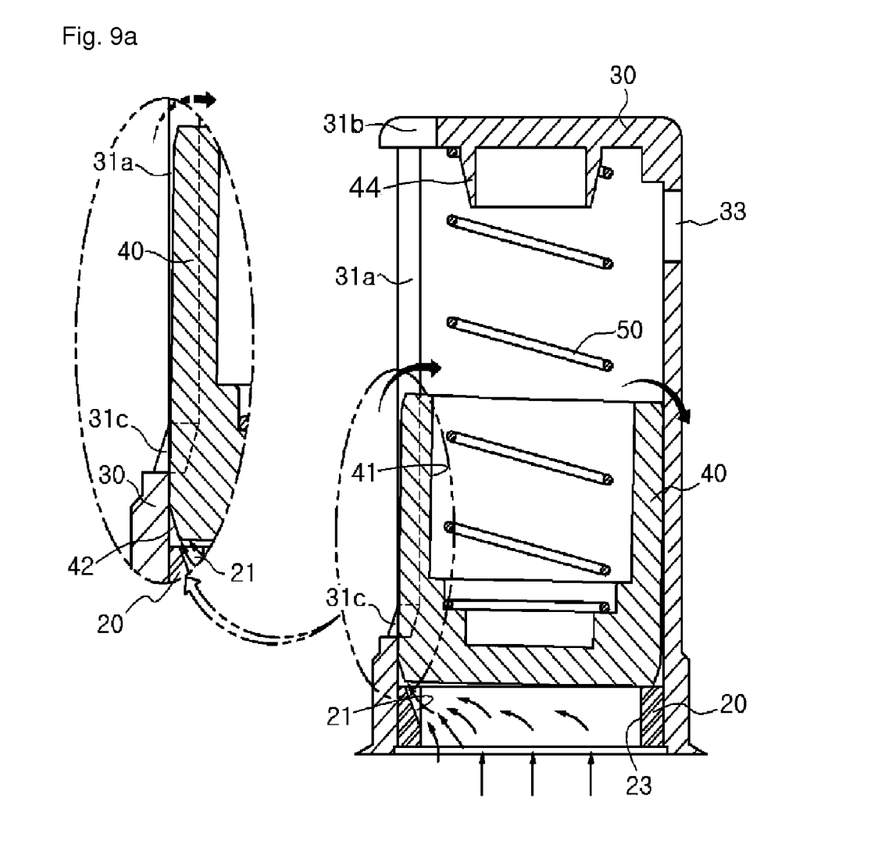
FIGS. 9A and 9B are side cross-sectional views illustrating the section valve of FIG. 6.
Figure 9B:
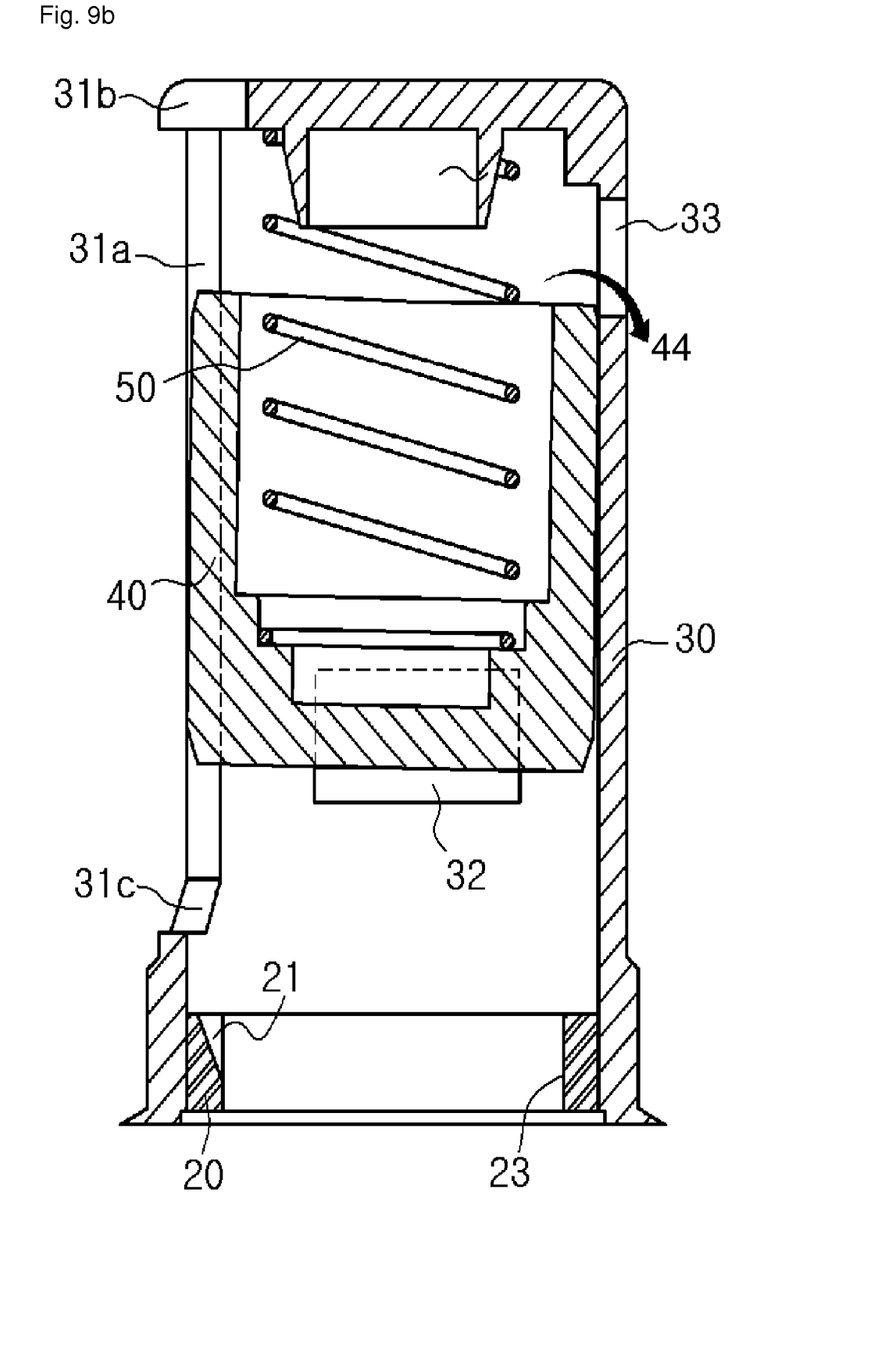

When the pressure of the valve case 30 and a peripheral region thereof is decreased according to an operation of a compressor (not shown), suction force is generated to move the spool valve 40 upward. Accordingly, the refrigerant introduction hole 23 and the first to third refrigerant discharge holes 31, 32, and 33 are sequentially opened.

That is, the valve seat 20 introduces the refrigerant from the compressor (not shown) through the refrigerant introduction hole 23, and the introduced refrigerant moves the spool valve 40 upward. Accordingly, the first to third refrigerant discharge holes 31, 32, and 33 disposed in the valve case 30 are sequentially opened, so as to discharge the refrigerant.

Figure 10:
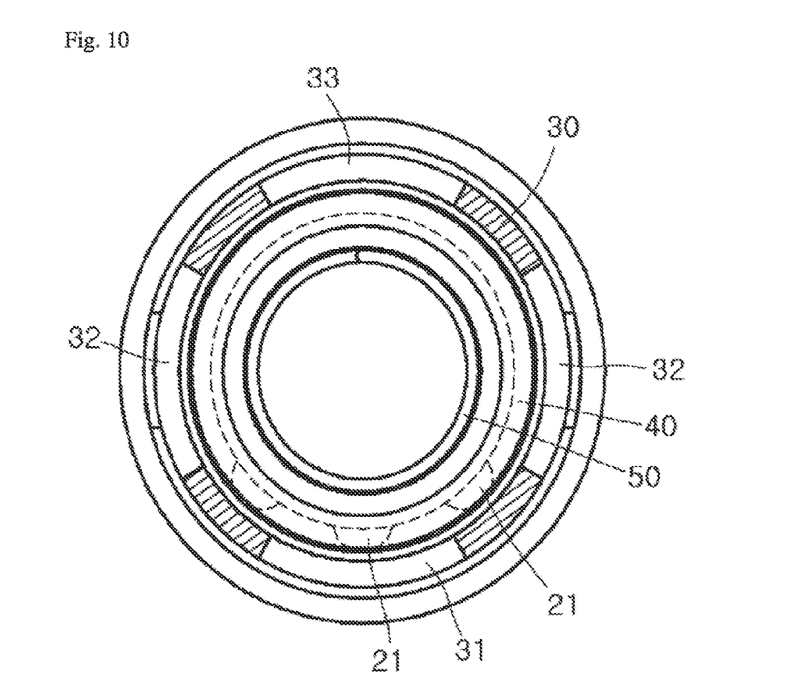
FIG. 10 is a horizontal cross-sectional view illustrating the section valve of FIG. 6.

The small gap formed between the inner wall of the valve case 30 and the outer wall of the spool valve 40 minimizes frictional resistance when the spool valve 40 is vertically moved. When the spool valve 40 is vertically moved within the valve case 30, the small gap inclines the spool valve 40 so as to minimize a contact area between the outer wall of the spool valve 40 and the inner wall of the valve case 30, thereby effectively decreasing noise.

When the spool valve 40 moves, the outer wall of the spool valve 40 contacts the inner wall of the valve case 30 to make noise that is proportional to a contact area therebetween. Thus, to decrease noise, the spool valve 40 should be brought into tight contact with the valve case 30, and a contact area therebetween should be minimized.

When the refrigerant introduction hole 23 is initially opened with the spool valve 40 at the lower end of the valve seat 20, the refrigerant is intensively discharged through the refrigerant guide recesses 21 disposed in the top of the inner wall of the valve seat 20, so as to raise the front portion of the spool valve 40.

When the front portion of the spool valve 40 is obliquely raised, contact areas between the inner wall of the valve case 30 and a front lower portion and a rear upper portion of the spool valve 40 are minimized, thereby minimizing frictional resistance.

In addition, when the spool valve 40 is vertically moved, the spool valve 40 tightly contacts the inner wall of the valve case 30. Thus, the spool valve 40 is prevented from moving left and right, thereby effectively preventing valve noise.

Since the discharge guide part 31c, decreasing in width downwardly at the lower end of the first refrigerant discharge hole 31, increases a discharge rate of the refrigerant when the spool valve 40 is initially opened, the front portion of the spool valve 40 is quickly raised, and quickly contacts the front portion of the inner wall of the valve case 30, thereby minimizing valve noise when the spool valve 40 is initially opened.

When the spool valve 40 is initially opened, since the refrigerant introduced through the refrigerant introduction hole 23 is discharged through only the first refrigerant discharge hole 31 disposed at the front portion of the check valve 10 provided with the refrigerant guide recesses 21, the state that the front portion of the spool valve 40 is raised is maintained.

After that, when the spool valve 40 is further raised to open the second refrigerant discharge holes 32 higher than the first refrigerant discharge hole 31, although the refrigerant is dispersed to both sides of the valve case 30, the rear portion of the valve case 30 is still closed. Thus, the state that the front portion of the spool valve 40 is raised is still maintained.

After that, when the spool valve 40 is further raised to open the third refrigerant discharge hole 33 higher than the second refrigerant discharge holes 32, the refrigerant is discharged in the four directions of the valve case 30, and the raised front portion of the spool valve 40 becomes parallel to the valve seat 20.

In other words, even though the top of the spool valve 40 is raised to be close to the third refrigerant discharge hole 33, the third refrigerant discharge hole 33 is not covered with the spool valve 40. Thus, the third refrigerant discharge hole 33 disposed on the high place effectively prevents the middle vibrations that when the spool valve 40 moves upward, an eddy generated from the first refrigerant discharge hole 31 excessively vibrates the spool valve 40.

After that, when the introduction of the refrigerant is completed, the spool valve 40 is moved downward by elasticity of the elastic member 50, and is returned to the initial position thereof near the valve seat 20.

Industrial Applicability

The present invention should not be construed as limited to the embodiments set forth herein and the accompanying drawings, and is only defined by scopes of claims.

Thus, it will be apparent to those skilled in the art that replacements, modifications, and variations can be made without departing from the spirit and scope of the invention.

The invention claimed is:

1. A check valve for a variable capacity compressor of a vehicle, comprising:
    a valve seat comprising a refrigerant introduction hole;
    a valve case disposed above the valve seat, and comprising refrigerant discharge holes along a circumferential surface of a cylindrical body thereof;
    a spool valve disposed within the valve case to selectively open and close the refrigerant introduction hole and the refrigerant discharge holes; and
    an elastic member disposed between the valve case and the spool valve,
    wherein the valve case comprises: a first refrigerant discharge hole disposed in a front portion of the circumferential surface thereof, wherein the first refrigerant discharge hole has a small width, and extends along a longitudinal direction of the valve case; a pair of second refrigerant discharge holes disposed in both side portions of the circumferential surface thereof, wherein a lower end of the second refrigerant discharge holes is higher than a lower end of the first refrigerant discharge hole; and a third refrigerant discharge hole disposed in a portion of the circumferential surface thereof to face the first refrigerant discharge hole, wherein a lower end of the third refrigerant discharge hole is higher than the lower end of the second refrigerant discharge holes,
    the valve seat comprises at least one refrigerant guide recess disposed in an inner wall thereof, and inclined upward, wherein the refrigerant guide recess is disposed within the width of the first refrigerant discharge hole, and
    a small gap is formed between an inner wall of the valve case and an outer wall of the spool valve such that when the refrigerant introduction hole is opened, a front portion of the spool valve is selectively raised, and the spool valve is inclined from the inner wall of the valve case, and tightly contacts the inner wall.

2. The check valve of claim 1, wherein the third refrigerant discharge hole, disposed in the portion of the circumferential surface to face the first refrigerant discharge hole, is adjacent to a closed top of the valve case.

3. The check valve of claim 1, wherein a vertical length of the spool valve is at least half an entire height of the cylindrical body of the valve case.

4. The check valve of claim 1, wherein the spool valve comprises grooves arrayed with a certain interval along a circumferential surface of a cylindrical body thereof, and extending in a longitudinal direction thereof.

5. The check valve of claim 1, wherein the first refrigerant discharge hole extends from the circumferential surface of the valve case to a top thereof.

6. The check valve of claim 1, wherein a lower end width of the first refrigerant discharge hole is smaller than an upper width thereof.

7. The check valve of claim 6, wherein the lower end of the first refrigerant discharge hole has one of an inverted triangular shape, a trapezoidal shape, and a tetragonal shape, which decreases in width upwardly.

* * * * *